United States Patent
Priepke (10) Patent No.: US 7,210,552 B2
(45) Date of Patent: May 1, 2007

(54) QUICK-RELEASE STEERING WHEEL

(75) Inventor: Edward H. Priepke, Lancaster, PA (US)

(73) Assignee: CNH America LLC, New Holland, PA (US)

(*) Notice: Subject to any disclaimer, the term of this patent is extended or adjusted under 35 U.S.C. 154(b) by 307 days.

(21) Appl. No.: 10/956,875

(22) Filed: Oct. 2, 2004

(65) Prior Publication Data
US 2006/0071464 A1 Apr. 6, 2006

(51) Int. Cl.
*B62D 1/16* (2006.01)
*B62D 1/22* (2006.01)

(52) U.S. Cl. .................. 180/321; 180/322; 74/552; 280/771

(58) Field of Classification Search .......... 280/775; 180/321, 322, 323, 324, 330, 331, 334; 74/552, 74/554, 556
See application file for complete search history.

(56) References Cited

U.S. PATENT DOCUMENTS

| | | | |
|---|---|---|---|
| 1,512,803 A | 10/1924 | Robinson et al. | |
| 2,384,890 A | 9/1945 | Coldwell | |
| 3,198,276 A | 8/1965 | Gordon | |
| 3,223,193 A | 12/1965 | Reynolds et al. | |
| 3,347,558 A | 10/1967 | Grimes et al. | |
| 3,693,744 A | 9/1972 | Horn et al. | |
| 4,091,640 A * | 5/1978 | Olkowski et al. | 464/134 |
| 4,450,927 A | 5/1984 | Hirata et al. | |
| 4,548,291 A | 10/1985 | Tanaka et al. | |
| 4,699,561 A * | 10/1987 | Tee | 414/699 |
| 5,052,512 A | 10/1991 | Pakosh et al. | |
| 6,390,764 B1 * | 5/2002 | Merlo et al. | 414/680 |
| 6,679,349 B1 * | 1/2004 | Pollish, Jr. | 180/326 |
| 6,802,193 B1 * | 10/2004 | Long | 70/207 |
| 6,971,675 B2 * | 12/2005 | Dahmer | 280/775 |
| 2005/0097982 A1 * | 5/2005 | Li | 74/552 |

FOREIGN PATENT DOCUMENTS

FR 2694259 A1 2/1994

* cited by examiner

*Primary Examiner*—Paul N. Dickson
*Assistant Examiner*—Joseph Rocca
(74) *Attorney, Agent, or Firm*—Stephen A. Bucchianeri; John William Stader; Michael G. Harme (57) ABSTRACT

A quick-release steering wheel for a work vehicle is configured to engage with and quickly release from one or more steering posts in an operator compartment of a vehicle. The operator compartment has two operator stations, each station having a steering post to which the steering wheel can be quickly and releasably attached. In use, the operator can pivot the operator seat in the operator compartment to face one or another of the two steering stations. The operator can quickly move the steering wheel from one operator station to the other without tools by depressing a spring-loaded pin. By removing the wheel from one station and moving it to the other, the operator makes additional room into which he can pivot or slide the seat. This arrangement permits the operator compartment to be made smaller and more compact by positioning the two steering posts and operator stations closer together.

22 Claims, 7 Drawing Sheets

QUICK-RELEASE STEERING WHEEL

FIELD OF THE INVENTION

The invention relates generally to work vehicles, and more particularly to tractors or work vehicles that are operated in a forward-facing and rear-facing mode.

BACKGROUND OF THE INVENTION

Tractors and other work vehicles typically operate in a forward-facing mode, with one steering wheel located immediately in front of the operator. The steering wheel is used in conjunction with accelerator pedal, brake pedal and other transmission controls to drive the vehicle over the work terrain. Occasionally, it is necessary to drive the vehicle in a reverse direction, and the vehicle operator will turn his head and look behind to do this.

For some tasks, it is necessary to operate the vehicle in a reverse direction for prolonged periods of time. It has been common practice to have a second steering location for this purpose, whereby the operator moves to the second (rear-facing) steering location to operate the vehicle in reverse. Having multiple operator stations or steering wheels on a vehicle to allow prolonged reverse operation is not uncommon.

The prior art teaches an arrangement of two steering locations on a tractor, with all steering location equipment duplicated: seat, steering post, steering wheel, pedals and associated transmission controls. This requires considerable space on the tractor, and duplicated equipment increases the manufacturing cost and time.

It is much less common for two steering locations to share a seat and be in an enclosed operator compartment. The prior art teaches an arrangement of two steering locations on a tractor, with a shared seat and all other equipment, including the steering wheel and steering post duplicated. There are drawbacks to this arrangement, however. The size of the steering wheels, and the necessity to have them far enough away from the operator so as not to restrict operator movement, still requires considerable space on the tractor. The operator compartment is relatively large as compared to a single steering location tractor. Also, the duplicated equipment increases manufacturing cost and time.

The prior art also teaches a pivoting seat with two steering wheels in an enclosed operator compartment, whereby the rear steering wheel is smaller or offset to the side for one-handed operation. These methods offer less accurate control and require the operator to learn a different steering method for reverse steering.

The prior art also teaches various pivoting arrangements of seat and operating controls to accomplish the task of forward-facing and rear-facing tractor operation. These arrangements fit into an operator compartment, but require extra parts to accomplish the pivoting function. This method also needs more space to the sides to allow the controls to pivot around the seat, resulting in an operator compartment that is larger than that on a single steering location tractor.

The prior art also teaches methods of moving operator controls from one steering location to another that require tools. Using tools to move the steering controls takes significant time from the operator's otherwise productive work day. Further, the operator may lose such tools. Additionally, the operator would need training in the procedure.

What is needed is a two steering station method that fits into a minimal space, similar to the space found in a single steering station operator compartment. What is also needed is a quick and easy means of switching from forward-facing operation to rear-facing operation, with no tools and minimal training required for the operator. What is further needed is a two steering location method that minimizes the number of duplicated parts. What is also needed is a method whereby the operator has an identical operating style whether operating in forward-facing or rear-facing mode, with a large comfortable steering wheel and a steering controls arrangement that allows the operator to look directly over the steering wheel. What is further needed is a retrofit kit to modify a single steering station or two steering station vehicle to have the aforesaid benefits.

SUMMARY OF THE INVENTION

In accordance with a first aspect of the invention, a steering actuator is provided that includes a steering post having a groove and a plurality of radially extending splines, a steering wheel having a first aperture with a plurality of inwardly facing splines, the steering wheel configured to engage the post, and a quick-release means having a pin configured to engage the groove on the steering post.

The pin may be spring loaded. One end of the pin may extend outside of the steering wheel, to be accessible by the operator. The steering wheel may further include a hub, a rim, a plurality of spokes, extending between the hub and the rim, and a second aperture defined by the hub, wherein the second aperture is configured to receive the pin, and the pin is configured to be depressed by an operator. The pin may have a first position in which the pin engages the post and prevents the wheel from being removed, and the pin may have a second position in which the wheel is removable from the post.

In accordance with a second aspect of the invention, an operator compartment for a work vehicle is provided that includes a first steering post, a second steering post, and a steering wheel configured to be removably attached to both the first and the second steering posts.

The operator compartment may be enclosed with a roof and windows. The operator compartment may include an operator seat, wherein the first steering post is located forward of the operator seat and the second steering post is located rearward of the operator seat. The first steering post, the operator seat, and the second steering post may be on an axial line extending frontward to rearward. The seat may be configured to pivot from a first position in which the seat faces the first steering post to a second position in which the seat faces the second steering post. The axial line may be the central longitudinal axis of the work vehicle. The steering wheel may be removable by a quick-release means which does not require a tool.

In accordance with a third aspect of the invention, a work vehicle is provided including a plurality of steering posts, each post having an associated proximity sensor, and a steering wheel configured to engage said plurality of posts, wherein said proximity sensor is configured to sense the presence of the steering wheel.

The proximity sensor may generate an electrical signal. The work vehicle may include a transmission, wherein the proximity sensor sends a signal to the transmission. The signal may enable or prevent the transmission from engaging.

In accordance with a fourth aspect of the invention, a retrofit kit for a work vehicle having an operator compartment with a first steering post is provided, the retrofit kit including a steering wheel, and a first steering post adapter, wherein the steering wheel is configured to mount on the first steering post adapter, and the steering post adapter is configured to mount on the first steering post.

The operator compartment may include a second steering post, and the retrofit kit may further include a second steering post adapter, wherein the second steering post adapter is configured to mount on the second steering post. The steering wheel may be a quick-release steering wheel, with a quick-release means for quickly mounting and releasing the steering wheel to and from the first and the second steering post adapters. The steering wheel may have a first aperture, and the first and second steering post adapters may be configured to engage the first aperture. The steering wheel may be configured to be slidably mounted to the first and second steering post adapters. The retrofit kit may include a first and second proximity sensors configured to detect the presence of the steering wheel. The first proximity sensor may be configured to mount to the first steering post adapter, and the second proximity sensor may be configured to mount to the second steering post adapter. The proximity sensors may be mechanical switches.

BRIEF DESCRIPTION OF THE DRAWINGS

FIG. 2 is a right side view of the identical work vehicle shown in FIG. 1. In FIG. 2, however, the seat and steering wheel are shown pivoted to their rear-facing position. The transmission and drive train are shown in phantom lines.

DETAILED DESCRIPTION OF THE PREFERRED EMBODIMENTS

Figure 1:
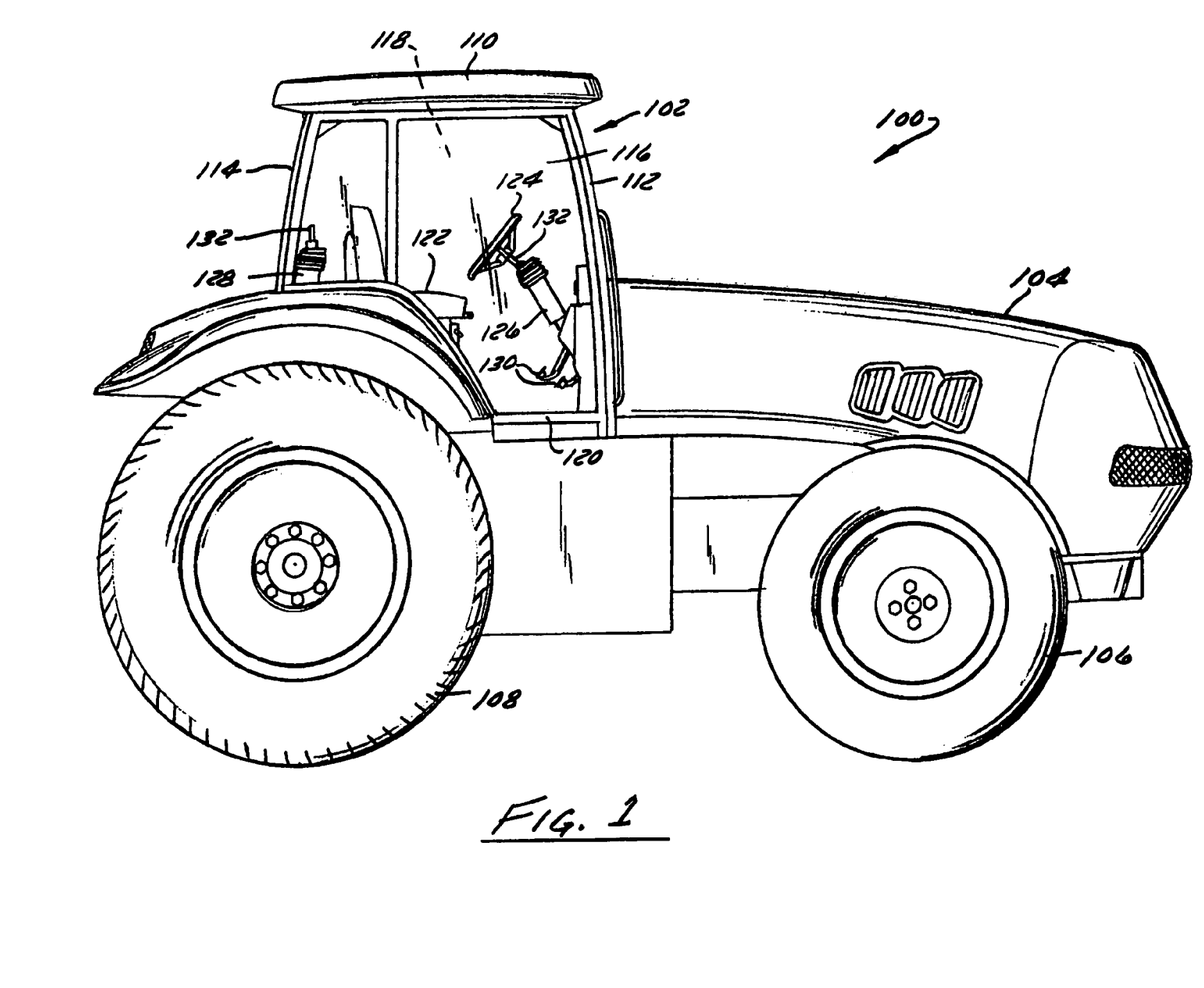
FIG. 1 is a right side view of a work vehicle having a quick-release steering wheel in accordance with the present invention, showing the seat and steering wheel in a forward-facing position.

FIG. 1 shows a work vehicle 100 that includes an operator compartment 102, an engine compartment 104, front wheels 106, and rear wheels 108. The operator compartment 102 is composed of a roof 110, a front wall including a front window 112, a back wall including a rear window 114, a right wall 116, a left wall 118 (shown through transparent glass right wall), and a bottom 120. The operator compartment 102 is completely enclosed by the roof, front and rear walls, left and right walls, bottom, and the back of the engine compartment.

The operator compartment 102 contains an operator seat 122, and all necessary operator steering controls including a steering wheel 124, a front steering post 126, a rear steering post 128, and front pedals 130. There are also rear pedals flanking the rear steering post 128, but these cannot be seen in this view.

The vehicle can be operated from one of two stations: a forward-facing station and a rear-facing station. The operator compartment includes the two stations and a seat that is movable between the two stations. Each station includes a steering post, and operator controls including pedals. The forward-facing station includes the front steering post 126, the pedals 130, and any other necessary operator controls (not shown). The rear-facing station includes the rear steering post 128, and associated pedals and operator controls (not shown).

The operator compartment in FIG. 1 is configured for forward-facing operation. The operator is using the forward-facing station to operate the vehicle The operator seat 122 is facing forward and the steering wheel 124 is mounted on the front steering post 126, thus the work vehicle is configured for primarily forward movement. The operator will primarily be looking through the front window 112 when operating in this manner.

The operator seat 122 is mounted to the bottom 120 and has a pivot affixed to its base (not shown) to allow it to rotate from a forward-facing position to a rear-facing position. The pedals 130 seen in FIG. 1 to be used in the forward-facing position are either duplicated for the rear-facing position or have a pivoting means similar to that used for the seat 122. The front steering post 126 may be attached to the bottom 120, to the back of the engine compartment 102, or to some other part of the vehicle structure. The rear steering post 126 may similarly be attached to the bottom 120 or to some other part of the vehicle structure. Each steering post has a free end 132 to which the steering wheel 124 is removably mounted.

The steering posts 126, 128 are connected by some means to the front (steering) wheels 106, which will turn left and right in accordance with steering wheel 124 counter-clockwise and clockwise rotational movement, respectively. Alternatively, if the vehicle is equipped with all-wheel steering, the steering posts would be simultaneously connected in some fashion to the rear wheels 108.

The steering posts 126, 128 are preferably adjustable both in a fore-and-aft direction and an orthogonal side to side direction. They may also be extendable along their longitudinal axes, for ease of access by operators of different heights. The steering posts may be composed of multiple independently flexible or stationary parts that further allow more accessible and comfortable use by the operator.

The steering wheel 124 is preferably of a large diameter, for accurate and easy operator control of the vehicle when it is moving. The front and rear walls of the operator compartment are spaced apart, and the front and rear steering posts are spaced apart, such that a similarly sized second steering wheel mounted on the rear steering post 128, would interfere with the operator seat 122 due to their proximity.

Figure 2:
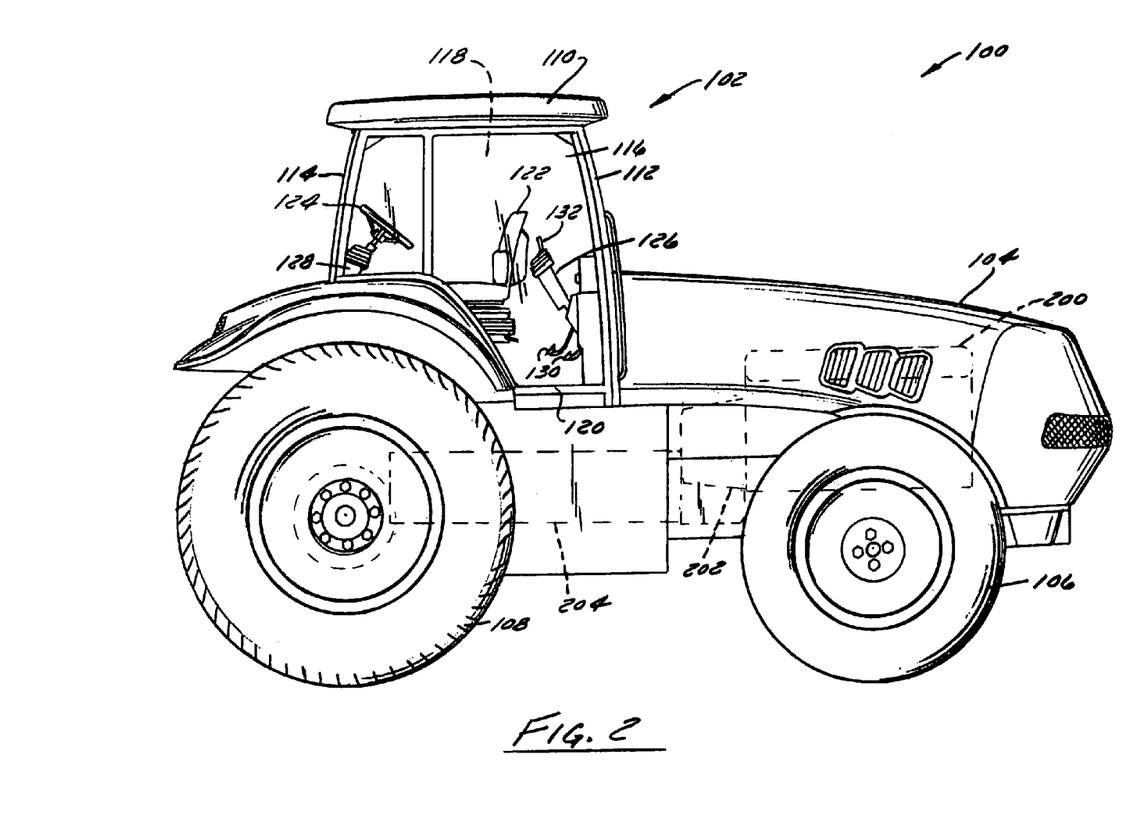

FIG. 2 shows the vehicle of FIG. 1 with the controls in the operator compartment configured for rear-facing operation. The operator is using the rear-facing station to operate the vehicle. The operator seat 122 is now pivoted to face the rear of the vehicle. The steering wheel 124 has been removed from the front steering post 126, and is mounted on the rear steering post 128. Thus the work vehicle is configured for primarily reverse movement. In this mode the operator can look through the rear window 114 without having to turn his head. The coupling of the steering wheel 124 to the front (steering) wheels 106 will be changed such that rotating the steering wheel clockwise results in a right turn similar to steering when in the forward-facing configuration. Alternatively, the steering wheel could be coupled to the rear wheels 108 when in rear-facing configuration, such that the rear wheels pivoted in response to steering wheel rotation. In other words, when the steering wheel is coupled to the rear steering post 128 and is rotated clockwise, the front wheels are steered or rotated counterclockwise. When the steering wheel is coupled to the front steering post 126, the front wheels are steered or rotated clockwise.

FIG. 2 also shows, in phantom, the vehicle drive system, which is generally disposed in the engine compartment 104 and includes the engine 200, the transmission 202 and the drive train 204. The pedals 130 and other transmission controls send signals to the transmission that enable or disable forward and reverse movement, and control the amount of power distributed from the engine 200 to the rear (drive) wheels 108. These signals may be transmitted electronically, hydraulically, or mechanically. The transmission is preferably hydraulically actuated but other methods are common.

To move the vehicle the operator adjusts the transmission controls to enable movement, and activates the pedals 130 to control engine power. The engine 200 then transmits power to the rear (drive) wheels 108 via the transmission 202 and the drive train 204. The vehicle is then in a drive state and moving either in either a forward or reverse direction.

The transmission controls may be adjusted by the operator such that the engine operates without transmitting power through the transmission to the drive wheels, i.e. vehicle movement is disabled. In such a case, the vehicle is in an idle state and no vehicle movement may occur regardless of pedal 130 operation.

Alternatively, the front wheels 106 may be driven in the same manner simultaneously with the rear wheels 108, for an all-wheel drive tractor. Or the front wheels 106 may be independently driven from the rear wheels 108.

Figure 3:
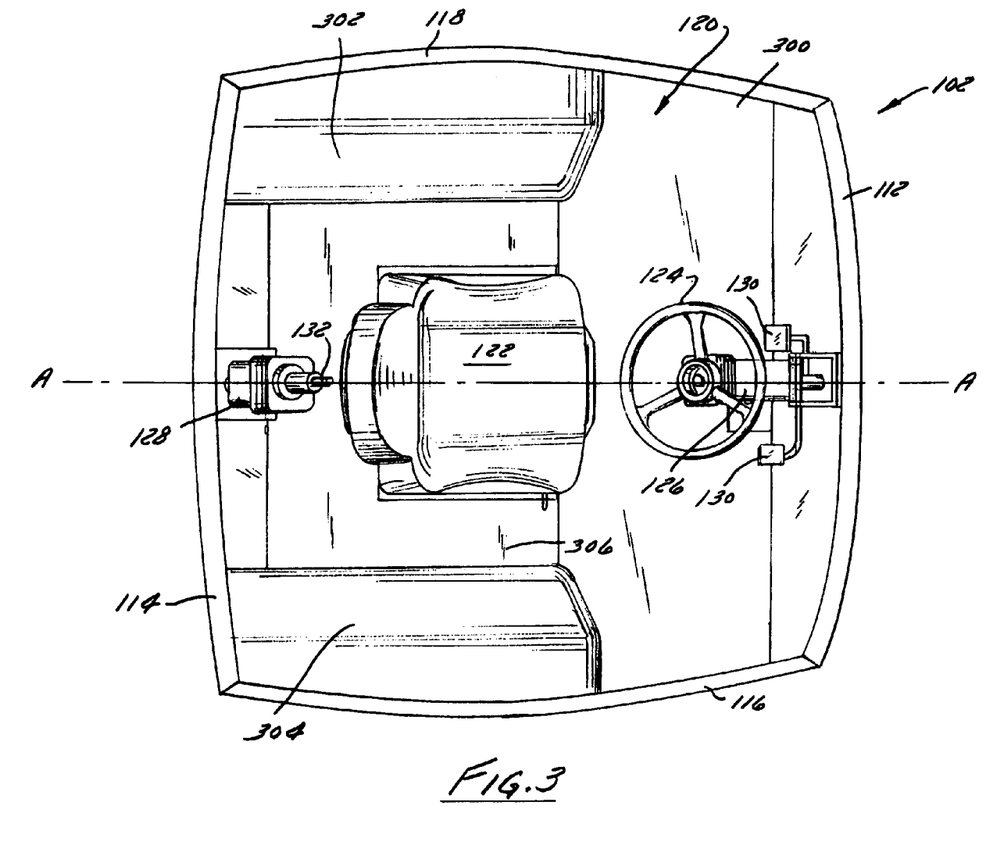
FIG. 3 is an interior top view of the operator compartment, showing the steering posts and seat disposed symmetrically on an axial central line, with the front of the operator compartment on the right side.

Referring now to FIG. 3, the interior of the operator compartment 102 is shown viewed from the top. The compartment is configured for forward-facing operation from the forward-facing operator station. The front steering post 126, steering wheel 124, operator seat 122, and rear steering post 128 are located along an axial centerline A—A of the vehicle. The operator has ample room for manipulating the steering wheel. When the seat 122 is pivoted to face the rear (see FIG. 2), and the steering wheel 124 is mounted to the rear steering post 128 by affixing it to the free end 132 (rear-facing configuration)—there similarly is ample room for accurate and comfortable steering.

The bottom 120 of the operator compartment 102 is composed of the floor 300, a left wheel well 302, a right wheel well 304, and a seat platform 306. The wheel wells 302, 304 extend laterally toward the center of the operator compartment, in order to allow the rear wheels 108 (FIG. 2) to be close together and not to extend far away from the tractor centerline, thus keeping the tractor wheelbase as small as possible. The seat platform 306 extends upward toward the operator, giving more room under the tractor for gearing, towing equipment hitches and other drive-related equipment. Additionally, the seat platform positions the operator high in the compartment, allowing a wide field of view laterally over the rear wheels. This represents a typical tractor interior, and illustrates how the left and right wheel wells 302, 304 and seat platform 306 encroach upon the operator working space. This encroachment reduces possible operator movement and severely limits the space for pivoting arrangements for operator controls.

FIGS. 3–9 depict the steering wheel 124 as used in the forward-facing configuration, mounted to the front steering post 126. The rear-facing configuration, mounting method and quick-release means are identical to the forward-facing configuration, except for the rear steering post 128 being used instead of the front steering post 126.

Figure 4:
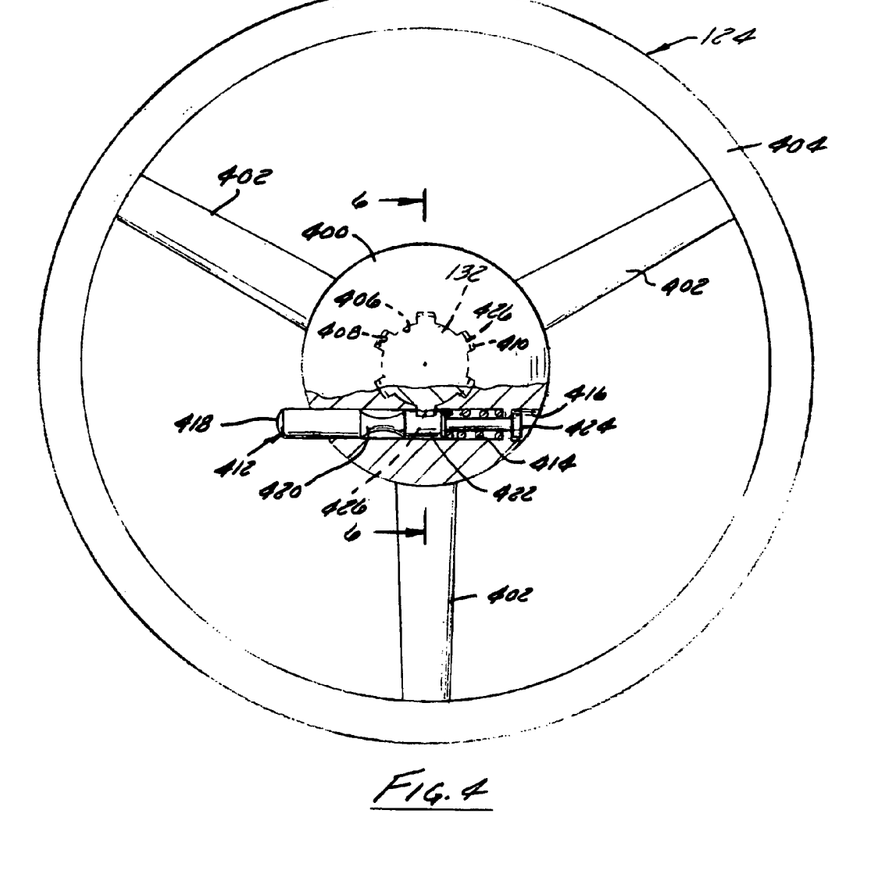
FIG. 4 is partial cross section view of the steering wheel from above, showing the quick-release means in a locking position.

FIG. 4 shows the steering wheel 124 in locked position mounted to the front steering post 126, viewed from above. The steering wheel includes a hub 400, multiple spokes 402, and a rim 404. The rim is fixed to the spokes, and the spokes are fixed to the hub. The hub and rim share the same central axis of rotation. The spokes 402 extend outward from the hub 400 to the rim 404, making a solid connection between the rim and hub, and allowing the operator to rotate the hub by rotating the rim of the wheel.

The steering wheel 124 is slidably mounted onto the free upper end 132 of the steering post 126. The steering wheel has a first aperture 406 in the center of the hub 400. This first aperture has multiple inwardly facing splines 408. The free end 132 has multiple outwardly facing splines 410. As the steering wheel 124 is slid onto the free end 132, each outwardly facing spline couples with a matching inwardly facing spline. The splines create a solid connection to assure that operator rotation of the rim 404 produces equivalent rotation of the free end 132 of the steering post 126. The spline connection is the preferred method for a quick-release connection between the hub and the steering post.

Figure 5:
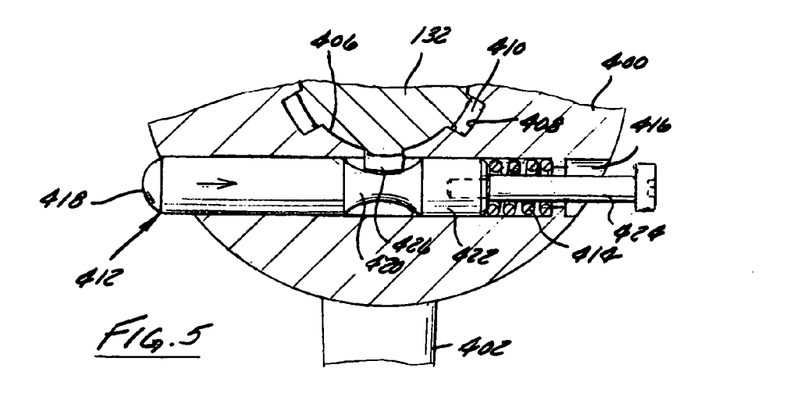
FIG. 5 is a partial cross section view similar to FIG. 4 showing the quick-release means in a close-up view, the quick-release means in an unlocked position.

FIGS. 4 and 5 show the quick-release mechanism used to lock and unlock the steering wheel 124 from the steering post 126. The quick-release means allows the quick-release steering wheel to be easily and rapidly dismounted from one steering post and mounted to the other without requiring tools, significant time, or special training. This maximizes operator efficiency when moving from forward-facing to rear-facing operator location, and vice versa.

In FIG. 4 the quick-release mechanism is in the locked position, and in FIG. 5 the mechanism is in the unlocked position. In the locked position, the steering wheel is securely mounted to the steering post such that the wheel will not come off the post under normal operating conditions. When the quick-release mechanism is in the unlocked position, the steering wheel may be lifted easily and quickly off the steering post.

The quick-release mechanism is composed of a pin 412, and a spring 414. The pin is generally cylindrical in shape. The pin extends through a second aperture 416 in the hub 400. The pin is further composed of four sections, the operating end 418, the unlocking section 420, the locking section 422 and the spring end 424. The operating end adjoins the unlocking section, which adjoins the locking section, which adjoins the spring end. The spring 414 surrounds the spring end 424 of the pin 412. The unlocking section 420 has a smaller diameter than the locking section 422.

In the locked state, shown in FIG. 4, the spring 414 is extended, thus extending the pin 412 such that the locking section 422 moves laterally into a matching groove 426 (see also FIGS. 6 and 7) in an outwardly facing spline 410. This is the natural rest state of the spring 414, whether the wheel 124 is mounted or off the steering post 126. In this state, the wheel cannot be mounted or dismounted from the post, because the locking section 422 of the pin 412 will interfere with the outwardly facing spline 410.

To dismount the steering wheel 124, the operator pushes the operating end 418 of the pin 412 to the right, toward the steering post 126, as shown in FIG. 5. The spring 414 compresses, and the unlocking section 420 moves to the right to adjoin the outwardly facing spline 410. Since the unlocking section has a smaller diameter, it does not interfere with the outwardly facing spline, and the wheel may pulled up off the steering post. Note that the operator must hold the pin in a depressed position in order to lift the wheel off the post.

There are alternative quick-release mechanisms, including a friction fit facilitated by a lever-actuated band, or a key and matching key slot. The quick-release pin shown herein is the preferred quick-release mechanism and is easily operable by one person without extra tools.

Figure 6:
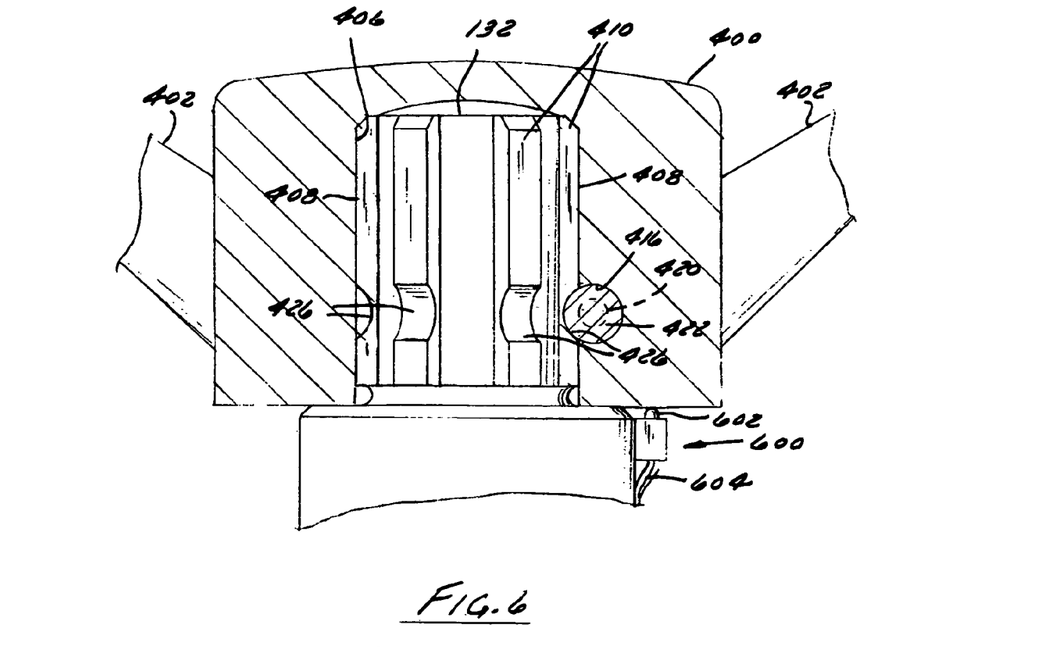
FIG. 6 is a partial cross section view of the steering wheel and quick-release means in locked position, taken at line 6—6 of FIG. 4 from the left side of the work vehicle, showing the steering post and steering wheel radial splines and proximity sensor activated (i.e. the mechanical switch depressed).
Figure 7:
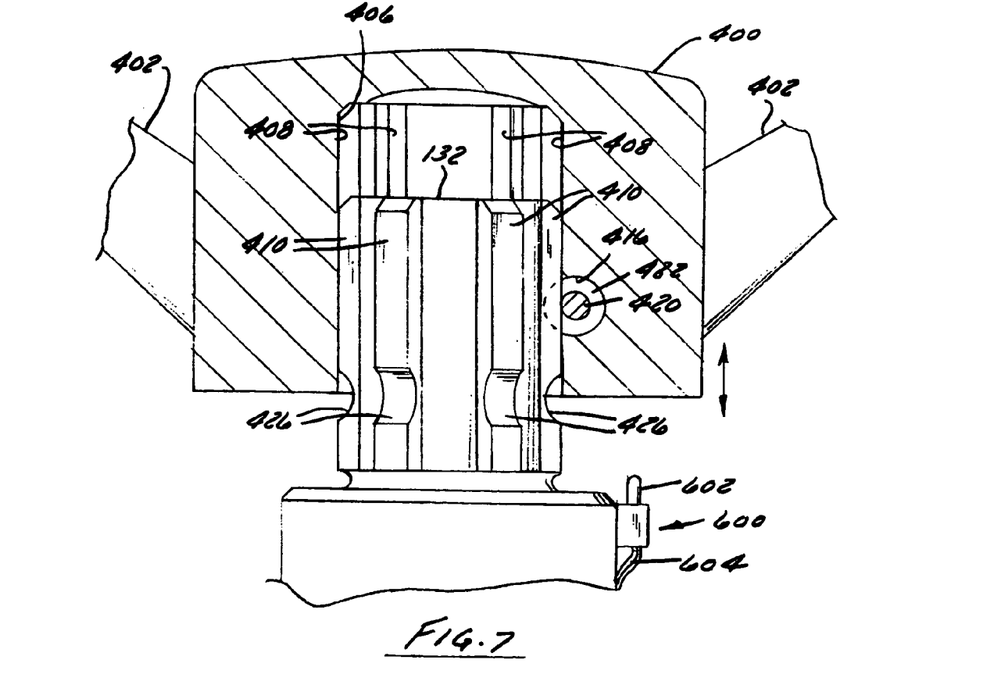
FIG. 7 is a partial cross section view similar to FIG. 6, showing the quick-release means in an unlocked position, the steering wheel partially removed, and the proximity sensor unactivated (i.e. the mechanical switch extended).

FIGS. 6 and 7 show the locked position and dismounting of the steering wheel 124 from the side, as well as one method of sensing the presence or absence of the steering wheel. In FIG. 6, the hub 400 is mounted and locked onto the steering post 126 in the manner described above. The pin 412 is not being depressed by the operator. The locking section 422 of the pin fills the groove 426 in the outwardly facing spline 410 of the free end 132 of the steering post 124, preventing the hub 400 from being removed from the free end.

A mechanical proximity sensor 600 is attached to the outside of the free end 132 adjacent to the spline area. The hub 400, when locked in place as shown in FIG. 6, depresses the actuator 602 of sensor 600, which sends an enabling signal via the cable 604. Cable 604 connects the proximity sensor to the transmission 202 (FIG. 2). Transmission 202 includes circuitry that is configured to enable operation of the transmission on receipt of the enabling signal and to disable operation of the transmission when the enabling signal is not present. The enabling signal tells the transmission control system that the steering wheel 124 is present and that the transmission 202 may engage, allowing power to flow from the engine 200 through the transmission to the rear wheels 108 (FIG. 2).

The wheel 124 is shown in the process of being dismounted from the hub 400 in FIG. 7. The pin 412 has been depressed by the operator. The unlocking section 420 of the pin slides past the outwardly facing spline 410, allowing the hub 400 to slide freely up and off the free end 132 of the steering post 126.

When the steering wheel is removed as shown in FIG. 7, the actuator 602 of the proximity sensor 600 is not depressed. This prevents the enabling signal from being sent to the transmission. This indicates to the transmission that a steering wheel 124 is not present and that the transmission 202 may not engage. The vehicle cannot be moved when the steering wheel is removed from both of the steering posts, since both steering posts are equipped with a sensor 600, and since transmission 202 will only engage when one or the other of sensors 600 are generating the enabling signal.

Figure 8:
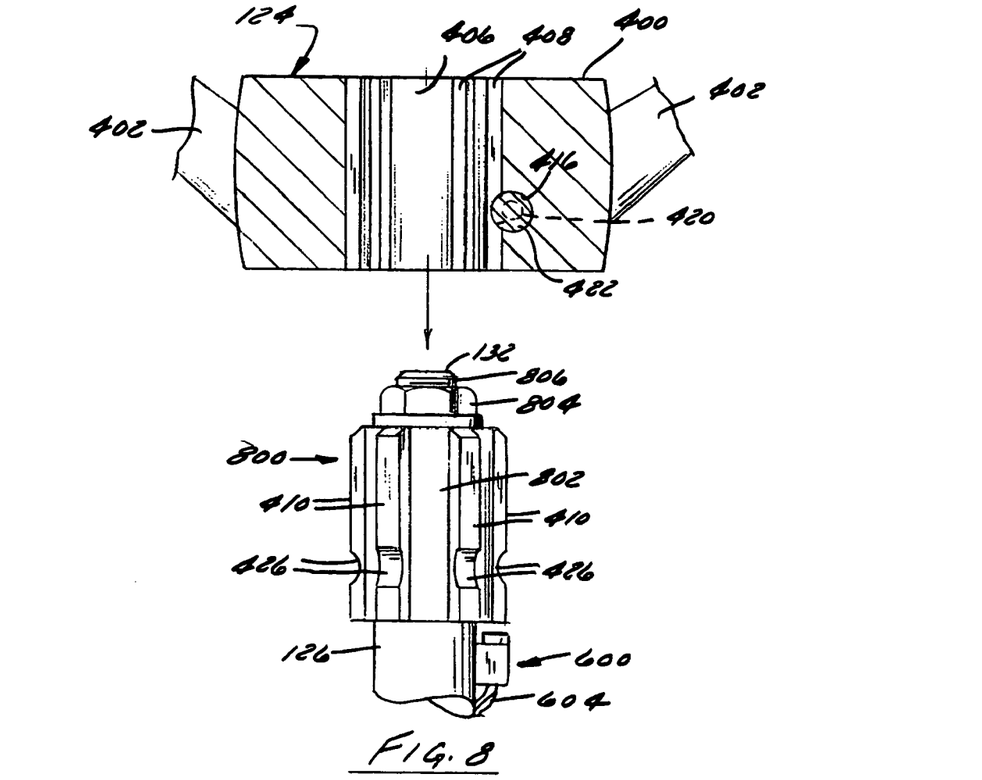
FIG. 8 is a partial cross section view taken at line 6—6 of FIG. 4, showing the steering wheel with quick-release means being mounted on a steering post adapter, the steering post steering adapter is affixed to a steering post, and an inductive proximity sensor is affixed to the adapter.
Figure 9:
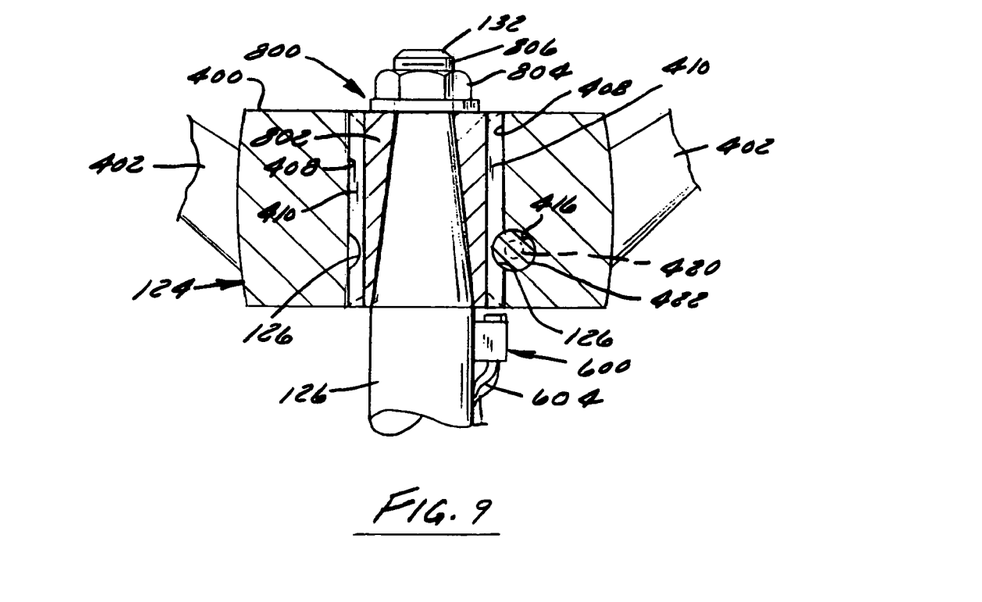
FIG. 9 is a partial cross section view similar to FIG. 8, showing the steering wheel in locked position on the steering post adapter, and the inductive proximity sensor in close approximation to the steering wheel.

FIGS. 8 and 9 illustrate an alternative proximity sensor 600 rather than a mechanical switch as shown in FIGS. 6–7. Instead of sensing by internal mechanical movement (FIGS. 6–7), the inductive proximity sensor 600 (FIGS. 8–9) senses the absence or presence of the steering wheel by inductance. In all other respects, the proximity sensors function identically.

Note that in the preferred embodiment each outwardly facing spline 410 has a groove 426 that will match the locking section 422 of the pin 412. Thus the pin does not have to be matched up with a specific spline, enabling the steering wheel to be mounted in multiple rotational positions, making it faster for the operator to mount the wheel.

FIGS. 8 and 9 are the same as FIGS. 7 and 6 respectively, with only three differences. First, FIGS. 8 and 9 show a retrofit of the quick-release steering wheel 124 coupled to a steering post adapter 800 and not directly to steering post 126 as shown in FIGS. 6 and 7. Second, FIG. 8 shows the steering wheel 124 lifted completely off the free end 132 of the steering post 126. Third, FIGS. 8 and 9 show an inductive proximity sensor 600 rather than the mechanical proximity sensor 600 shown in FIGS. 6 and 7.

Not every vehicle in the field may have a splined quick-release steering wheel. Nonetheless, these vehicles may be equipped with a quick-release steering wheel by using an appropriate steering post adapter 800. This retrofit of a non-splined steering post and replacement of a non-splined steering wheel with a splined quick-release steering wheel can be accomplished with a splined quick-release steering wheel and splined steering post adapter mounted to the non-splined steering post.

In the alternative embodiment shown in FIGS. 8 and 9, the steering post adapter 800 has two surfaces: an inside surface and an outside surface. The inside surface is smooth and configured to mate with the steering post 126. The outside surface is splined and configured to mate with the steering wheel 124. Since FIGS. 8 and 9 show the retrofit applied to a vehicle that did not previously have a quick-release steering wheel, the free end 132 of the steering post does not have splines formed integrally on an outer surface thereof. Instead, free end 132 has a conical tapered shaft portion to which the adapter 800 having a mating conically configured central aperture is coupled to exactly duplicate the splined outer surface of free end 132 shown in FIGS. 1–7 in all respects.

The steering post adapter 800 has a splined outer surface 802. It is fixed to the steering post by a nut 804. Adapter 800 is slidably mounted onto the free end 132 of the steering post 126. The nut 804 has been threaded onto threads 806 on the the outermost end of the free end 132, and tightened. Nut 804 presses against adapter 800 and holds it tightly to the free end 132 such that they always rotate together.

In this example, the first aperture 406 in the hub 400 extends completely through the hub, but this is not a requirement. The operation of the quick-release mechanism is exactly the same as already described.

FIGS. 8 and 9 also show an alternative proximity sensor 600 rather than the mechanical proximity sensor 600 (shown in FIGS. 6 and 7). Sensor 600 is mounted on the steering post adjacent to adapter 800. Alternatively, it could be mounted on the steering pos adapter itself, to be held in position by and supported by the adapter. The inductive proximity sensor 600 (FIGS. 8–9) detects the hub 400 by inductance rather than a mechanical movement internal to the sensor. Proximity sensor 600 (FIGS. 8–9) sends the identical enabling signal that controls transmission 202 in exactly the same manner as the proximity sensor 600 in FIGS. 6 and 7. In FIG. 8, the proximity sensor 600 does not detect the steering wheel 124 because the hub 400 is too far away.

FIG. 9 shows the steering wheel 126 in locked operating position. The inductive proximity sensor 600 senses the presence of the hub 400 and sends the enabling signal to transmission 202 that allows the transmission 202 to engage, as previously described for the mechanical proximity sensor 600 in FIGS. 6 and 7.

Both FIGS. 8 and 9 show the pin 412 in the locked or resting state. In this state, the operating end 418 of the pin is fully extended away from the hub 400.

Figure 10:
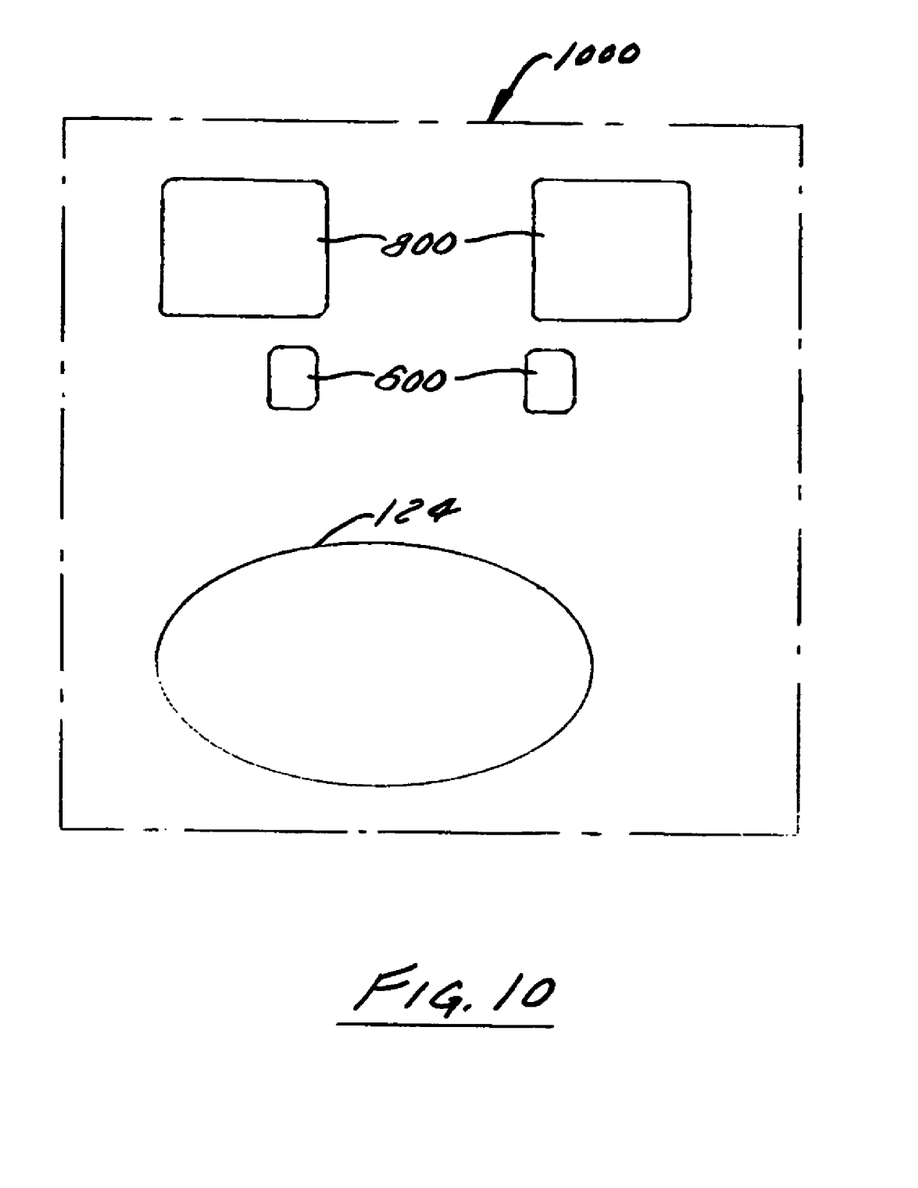
FIG. 10 illustrates a steering wheel retrofit kit for retrofitting a tractor or work vehicle with a quick release steering wheel, the kit including a steering wheel and steering post adapters.

A vehicle with two steering posts but without a quick-release steering wheel can be retrofitted to use a quick-release steering wheel. This would require a retrofit kit 1000 as seen in FIG. 10. The kit includes a quick-release steering wheel 124, two steering post adapters 800, and two proximity sensors 600. Alternatively, for a vehicle having only one steering post, the retrofit kit may include a quick-release steering wheel 124 and one steering post adapter 800. The retrofit kit 1000 can be packaged and sold separately, and preferably includes a steering wheel, two adapters and two proximity sensors, but can be provided as one adapter and a steering wheel, or in other combinations and with other components.

There are alternative approaches to the preferred embodiments such as different methods of sensing and communicating the presence of the steering wheel. Also, the steering wheel may be of one piece instead of a rim, spokes and hub. The quick-release mechanism may be achieved by alternate means. The groove in the outwardly facing splines may be only in one spline rather than each spline. In the retrofit case, the hub aperture does not have to extend completely through the hub.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

I claim:

1. A steering actuator comprising:
   a steering post having a groove and a plurality of radially extending splines; the steering post also having a proximity sensor;
   a steering wheel having a first aperture with a plurality of inwardly facing splines, said steering wheel configured to engage the post; and
   a quick-release means having a pin configured to engage the groove on the steering post;
   wherein the proximity sensor is configured to sense the presence of the steering wheel.

2. The steering actuator of claim 1, wherein the pin is spring loaded.

3. The steering actuator of claim 2, wherein one end of the pin extends outside of the steering wheel, said one end accessible by the operator.

4. The steering actuator of claim 3, wherein the steering wheel further comprises:
   a hub;
   a rim; and
   a plurality of spokes, extending between and coupling the hub to the rim;
   wherein the hub defines a second aperture, and further wherein the second aperture is configured to receive the pin, and the pin is configured to be depressed by an operator.

5. The steering actuator of claim 4, wherein the pin has a first position in which the pin engages the post and prevents the wheel from being removed, and further wherein the pin has a second position in which the wheel is removable from the post.

6. An operator compartment for a work vehicle comprising:
   a first steering post having a first proximity sensor;
   a second steering post having a second proximity sensor; and
   a steering wheel configured to be removably attached to both the first and the second steering post wherein said first and second proximity sensors are configured to sense the presence of the steering wheel.

7. The operator compartment of claim 6, wherein the operator compartment is enclosed with a roof and windows.

8. The operator compartment of claim 7, further comprising:
   an operator seat, wherein the first steering post is located forward of the operator seat and the second steering post is located rearward of the operator seat.

9. The operator compartment of claim 8, wherein the first steering post, the operator seat, and the second steering post are on an axial line extending frontward to rearward.

10. The operator compartment of claim 9, wherein the seat is configured to pivot from a first position in which the seat faces the first steering post to a second position in which the seat faces the second steering post.

11. The operator compartment of claim 10, wherein the axial line is the ventral longitudinal axis of the work vehicle.

12. The operator compartment of claim 11, wherein the steering wheel is removable by a quick-release means which does not require a tool.

13. A work vehicle comprising:
   a plurality of steering posts, each post having an associated proximity sensor; and
   a steering wheel configured to engage said plurality or posts;
   wherein said proximity sensor is configured to sense the presence of the steering wheel.

14. The work vehicle of claim 13, wherein the proximity sensor generates an electrical signal.

15. The work vehicle of claim 13, further comprising a transmission, wherein the proximity sensor sends a signal to the transmission.

16. The work vehicle of claim 15, wherein the signal enables or prevents the transmission from engaging.

17. A retrofit kit for a work vehicle having an operator compartment with a first steering post and second steering post, the retrofit kit comprising:
   a steering wheel;
   a first steering post adapter, wherein the steering wheel is configured to mount on the first steering post adapter, and the steering post adapter is configured to mount on the first steering post;

a second steering post adapter, wherein the second steering post adapter is configured to mount on the second steering post; and a first and second proximity sensor configured to detect the presence of the steering wheel.

18. The retrofit kit for a work vehicle of claim 17, wherein the steering wheel is a quick-release steering wheel, with a quick-release means for quickly mounting and releasing the steering wheel to and from the first and the second steering post adapters.

19. The retrofit kit for a work vehicle of claim 18, wherein the steering wheel has a first aperture, and the first and second steering post adapters are configured to engage the first aperture.

20. The retrofit kit for a work vehicle of claim 19, wherein the steering wheel is configured to be slidably mounted to the first and second steering post adapters.

21. The retrofit kit for a work vehicle of claim 17, wherein the first proximity sensor is configured to be mounted adjacent to the first steering post adapter, and the second proximity sensor is configured to be mounted adjacent to the second steering post adapter.

22. The retrofit kit for a work vehicle of claim 17, wherein the proximity sensors are mechanical switches.

* * * * *